Sept. 29, 1925.
A. KEGRESSE
SUPPORTING DEVICE FOR VEHICLE AXLES
Filed Aug. 12, 1921
1,555,121
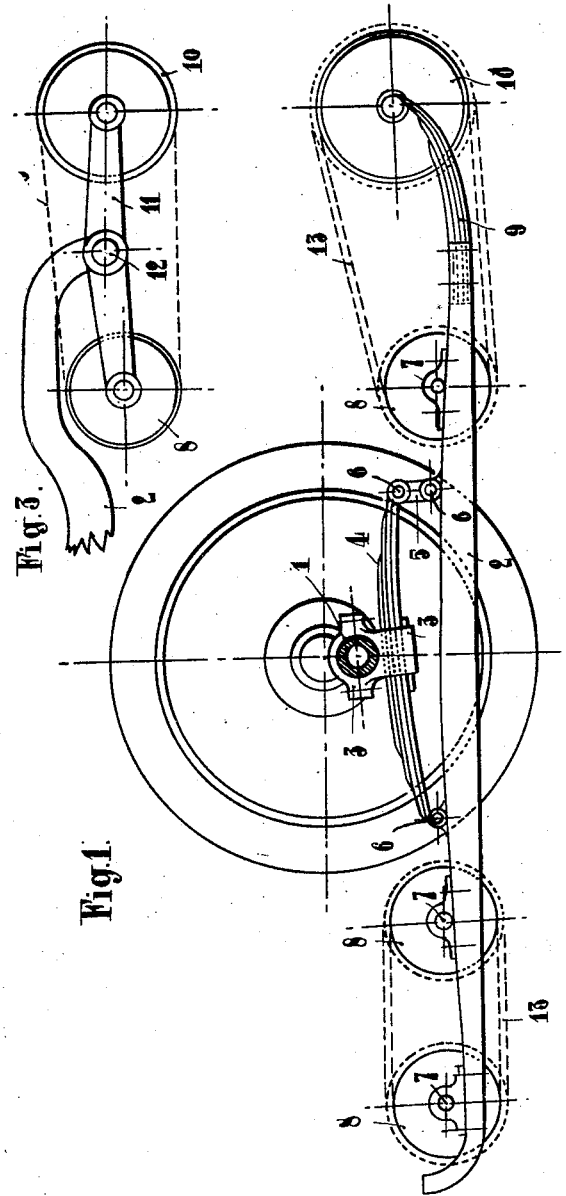
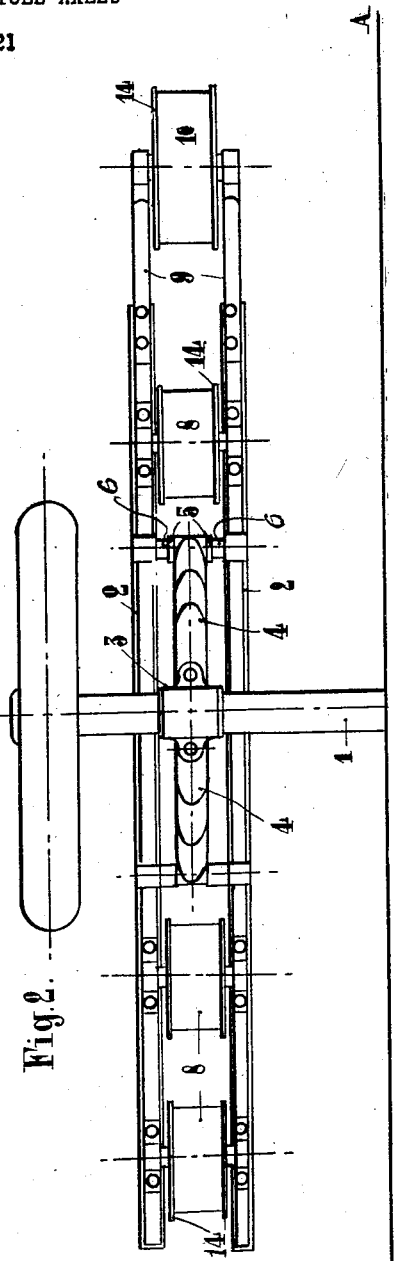
INVENTOR
Adolphe Kégresse,
BY
Emil Bonnelycke
ATTORNEY Patented Sept. 29, 1925.

1,555,121

UNITED STATES PATENT OFFICE.

ADOLPHE KÉGRESSE, OF PARIS, FRANCE.

SUPPORTING DEVICE FOR VEHICLE AXLES.

Application filed August 12, 1921. Serial No. 491,764.

*To all whom it may concern:*

Be it known that I, ADOLPHE KÉGRESSE, a citizen of the Republic of France, residing at Paris, France, have invented certain new and useful Improvements in Supporting Devices for Vehicle Axles, of which the following is a specification.

This invention relates to supporting devices for the axles of wheeled vehicles; and its object, stated briefly, is to provide an improved device which may, without difficulty, be permanently secured beneath the supporting axle (usually the front or steering axle) of an automobile or other vehicle.

To enable vehicles to cross ditches and trenches or the like, it has been proposed, heretofore, to utilize track sections or rails which are carried on the vehicle and which, when the vehicle reaches a ditch, are placed across the ditch to form a bridge over which the vehicle can travel. The use of such tracks or rails has, however, proven somewhat impractical, since the vehicle must be stopped not only on reaching the ditch, in order to permit the tracks to be unloaded and positioned, but also, after the vehicle has crossed the ditch, for the purpose of taking up the tracks and re-loading them on the vehicle. Furthermore, the tracks must be laid with the utmost care in order to insure proper support for the vehicle, and by reason of their narrowness render the steering of the vehicle awkward and frequently quite difficult.

The present invention has been designed to completely overcome all of the above drawbacks, due to the particular construction and arrangement of its component parts, as hereinafter explained.

In the accompanying drawing, Figures 1 and 2 are, respectively, a side elevation and a plan view of one embodiment of the invention, the line A—A in Fig. 2 indicating the longitudinal axis of the vehicle; and Fig. 3 is a detail showing a slight modification.

Referring more particularly to the drawing, 1 indicates the supporting axle, and 2, 2 two rigid beams or bars which conjointly form a rail. A pair of these bars is disposed adjacent each end of the axle and said bars are connected therewith in such a way as to enable them to swing or oscillate. In the construction illustrated, a two-part ring 3 is journaled loosely on each axle end, and is suitably clamped or otherwise secured to the central portion of a leaf spring 4, the ends of which are connected with the rail beams 2 by means of cross-bolts 6; Figs. 1 and 2 showing intermediate links 5 between one end of the spring and the beams, which links are themselves pivoted at their ends to the adjacent bolts.

These bolts 6 serve to connect the two rail beams 2 together; but in addition thereto, short shafts or bolts 7 are also employed, each bolt 7 having a roller 8 loosely mounted on it. The number of rollers used may vary according to the length of the beams, and the width of the rollers is such as to enable them to fit between the beams, as indicated in Fig. 2. In the embodiment shown, there are three rollers 8, two in rear of the axle, and one in front thereof; and a fourth roller 10 is located in advance of the last-named roller 8, its supporting bolt or axle being attached to the front ends of a pair of buffer springs 9 which are fastened at their rear ends to the front ends of the beams 2 and constitute extensions thereof. Each pair of rollers may be connected by a belt 13 to prevent them from sinking deeply into soft ground; and in such event, the rollers will be provided with peripheral flanges 14 to avoid displacement of the belts.

In place of the construction just described, either pair of rollers 8, 8 or 8, 10, or both pairs, may be carried by a frame which is pivoted at its center to the adjacent ends of the beams, so as to rock or swing about a horizontal axis. A mounting of this type is illustrated in Fig. 3, wherein the axles of the front rollers 8, 10 are journaled in the ends of a pair of bars 11 between which the rollers are disposed; said bars constituting the above-mentioned frame and being centrally pivoted on the ends of a shaft or axle 12 mounted horizontally in the rail beam ends, which latter are curved, as shown, to extend over roller 8.

In use, the device comes into action automatically, as soon as the adjacent vehicle wheel passes the edge of the bank of the ditch or trench, without any operation on the part of the driver, the rollers 8 and 10 engaging the ground and thus ensuring the continued progress of the vehicle. Both axles are preferably equipped with the attachments, as will be understood.

I claim as my invention:

1. A supporting device for vehicle axles, comprising a rail adapted to be disposed beneath, and pivotally suspended at its center from, one axle of the vehicle so as to extend in opposite directions beyond the axle and the wheels thereon, and to rock in a vertical plane about said axle as a center; and rollers carried by said rail adjacent its ends, the rail being free to operate automatically in accordance with the surface of the ground.

2. A supporting device for vehicle axles, comprising a rail adapted to be disposed beneath, and pivotally suspended at its center from, one axle of the vehicle so as to extend in opposite directions beyond the axle and the wheels thereon, and to rock in a vertical plane about said axle as a center; and a pair of rollers carried by said rail adjacent each end thereof, each pair of rollers having an individual connecting belt.

3. A supporting device for vehicle axles, comprising a rail adapted to be disposed beneath, and pivotally suspended at its center from, one axle of the vehicle so as to extend in opposite directions beyond the axle and the wheels thereon, and to rock in a vertical plane about said axle as a center, said rail embodying a pair of counterpart, spaced, parallel beams; a pair of rollers carried by said rail adjacent each end thereof and projecting into the space between the beams; and a connecting belt individual to each pair of rollers.

4. A supporting device for vehicle axles, comprising a rail adapted to be disposed beneath, and pivotally suspended at its center from, one axle of the vehicle so as to extend in opposite directions beyond the axle and the wheels thereon, and to rock in a vertical plane about said axle as a center, said rail embodying a pair of counterpart, spaced, parallel beams, each of which has a buffer spring at its front end; and a plurality of rollers carried by said rail adjacent its opposite ends and projecting into the space between the beams.

5. The combination, with a vehicle axle, and wheels on the ends thereof, of a ring loosely journaled on the axle adjacent the inner side of each wheel; a leaf spring clamped at its center to the bottom of each ring and disposed beneath and transversely of the axle; a rail disposed beneath and parallel with each spring and extending a considerable distance beyond the same at opposite ends, and to which the ends of the spring are pivotally connected; and a plurality of rollers carried by the rail adjacent each end thereof.

In testimony whereof I have signed this specification.

ADOLPHE KÉGRESSE.